J. W. & C. E. HYATT.
GAME BALL WITH COMPOSITION COATING.
APPLICATION FILED JULY 2, 1915.
1,156,144.
Patented Oct. 12, 1915.
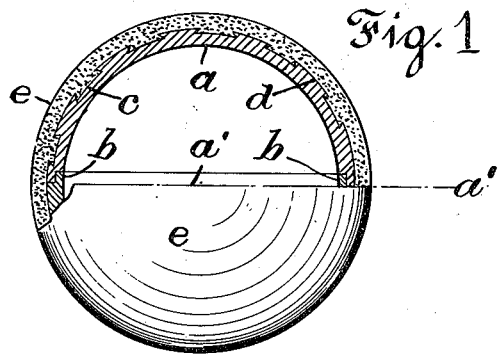
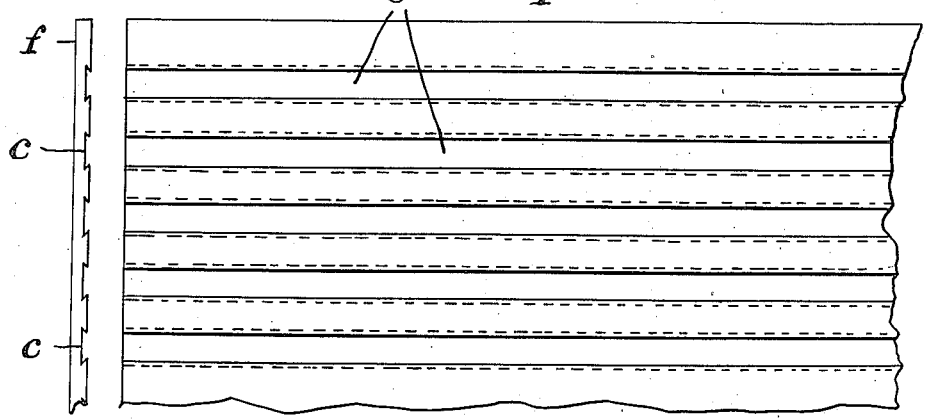
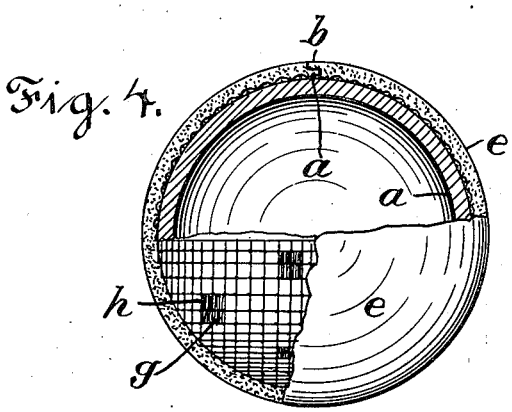
Inventors
Charles E. Hyatt,
John W. Hyatt, per
Thomas S. Crane, Atty.

UNITED STATES PATENT OFFICE.

JOHN W. HYATT AND CHARLES E. HYATT, OF EAST ORANGE, NEW JERSEY.

GAME-BALL WITH COMPOSITION COATING.

1,156,144. Specification of Letters Patent. Patented Oct. 12, 1915.

Application filed July 2, 1915. Serial No. 37,778.

*To all whom it may concern:*

Be it known that we, JOHN W. HYATT, residing at 45 North Arlington avenue, East Orange, county of Essex, and State of New Jersey, and CHARLES E. HYATT, residing at 528 Springdale avenue, East Orange, county of Essex, and State of New Jersey, both citizens of the United States, have invented certain new and useful Improvements in Game-Balls with Composition Coating, fully described and represented in the following specification and the accompanying drawings, forming a part of the same.

This invention relates to the manufacture of balls having a composition coating which is molded while in a plastic condition upon a hard core and allowed to harden and season thereon. Celluloid, casein compounds, hard rubber, and other compositions are used for such purposes. The object of making such a construction is, in some cases, to avoid the expense of making the whole ball of a more costly substance, and in other cases to secure greater hardness, weight, or resiliency in the finished article; but the means heretofore used to secure the adhesion of the plastic coating to a metallic core have been unsatisfactory in certain cases, and the present invention furnishes a metallic core with an undercut surface, into the cavities of which the plastic composition may be embedded, and thus secured firmly upon the surface of the core. The undercutting may be formed by grooving the surface of the core, or by attaching thereto a closely fitting shell of wire-net, the meshes of which form undercut spaces to engage the plastic material.

The construction will be understood by reference to the annexed drawing, in which—

Figure 1 is an elevation of a billiard ball with one-half above the line $a'$, shown in section, and the surface of the core furnished with dovetail grooves; Fig. 2 is an end view of a sheet of metal prepared for manufacturing such cores; Fig. 3 is a side view of such sheet; and Fig. 4 is a view of a billiard ball having a wire-net or cloth upon the smooth surface of an iron core, and the coating engaged with the meshes of the net.

The upper half of the ball is broken away to the center line, and a portion of the lower half has the coating omitted to show the wire-net upon the surface of the core.

The core is shown in Fig. 1 made in two hemi-spherical sections $a$, $a'$, formed upon their edges with tongues $b$ adapted to engage one another, and such sections are united by brazing the tongues together, thus forming a core of spherical shape. Dovetailed grooves $c$ are shown formed in the exterior of the sections with ridges $d$ between the same, the edges of which overhang the edges of the grooves $c$, and thus tend to lock the composition $e$ securely to the core when molded thereon. Such molding is done under suitable pressure, to completely engage the plastic composition with the dovetailed grooves. The sections of such a core are readily made by first forming a plate $f$ of suitable sheet metal with the dovetailed grooves $c$, as shown in Fig. 3, and then cutting circular pieces of suitable size from such grooved plate, stamping them to hemi-spherical form, and then forming the tongues upon the edges to fit them for brazing together. The pressing of the circular plates into hemi-spherical form obviously distorts the position of the dovetailed grooves upon their surface, but this is wholly immaterial, as the plastic coating is engaged with the core by undercut cavities whatever their form of arrangement upon the core's surface.

A similar sheet metal core is represented in Fig. 4 with a wire-net $g$ fitted snugly to its surface, and secured thereon by spots of solder $h$ which are enabled to adhere to the core by tinning the surface of the core before the net is applied. The net for such purpose is formed of circular pieces stamped to hemi-spherical form; and when secured upon the outside of the core form undercut cavities upon its entire exterior. When the plastic material is molded upon the core, pressure is employed sufficient to crowd the material into the undercut cavities between the wires of the net, which thus lock the coating securely upon the core.

Having shown two methods of carrying out our invention, it is evidently immaterial how the invention be carried out, as its essential feature is the provision of the core's surface with undercut meshes, grooves, or cavities, by which the plastic composition is securely locked to the core when the composition is forced into such cavities and hardens therein.

We have not made any claim herein to the process of manufacturing the article, but have restricted the present invention to the product only.

Having thus set forth the nature of the invention what is claimed herein is:

1. A ball having a metallic core provided upon its surface with undercut cavities and having a coating of plastic material pressed closely upon the core and having an engagement with the undercut cavities.

2. A ball having a metallic core provided upon its surface with a wire-net attached thereto, as by solder, and having a coating of plastic material pressed closely upon the wire-net and engaging its undercut cavities.

In testimony whereof we have hereunto set our hands.

JOHN W. HYATT.
CHARLES E. HYATT.